Patented July 11, 1933

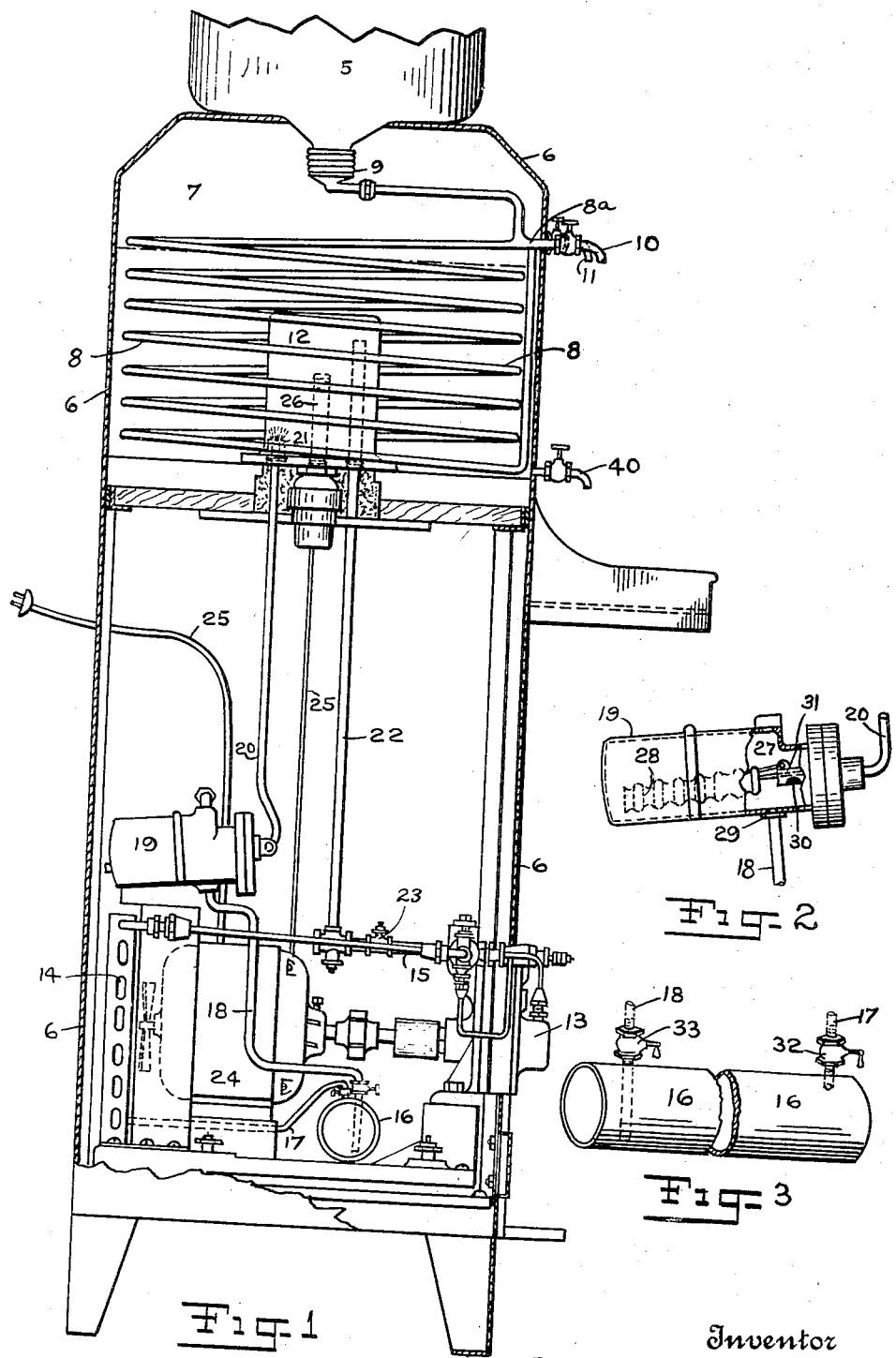

1,917,927

UNITED STATES PATENT OFFICE

ALBERT C. DENSLOW, OF NEW YORK, N. Y., ASSIGNOR TO STATEN ISLAND SHIPBUILDING CO., OF STATEN ISLAND, NEW YORK, A CORPORATION OF NEW YORK

BEVERAGE COOLING APPARATUS

Application filed February 1, 1929. Serial No. 336,748.

This application is a continuation in part of my application for refrigeration means and methods, Serial No. 327,809, filed December 22nd, 1928. The present improvements relates, in general, to refrigeration and more particularly to a device for chilling or cooling beverages.

A primary object, among others, of the present improvements is to provide a novel beverage cooler of the type wherein the liquid to be cooled is supplied from replaceable bottles, casks or demijohns which are inverted and partially inserted in the cooler housing.

A further object is to provide a novel unit of the aforementioned character wherein the beverage may be tapped in an unchilled or chilled state, in combination with automatic means for accomplishing the cooling function.

A still further object is to provide a novel cooler, of the replaceable bottle type, wherein the cooling of the drinking water is accomplished without the employment of cumbersome refrigerating coils, and wherein the refrigerating surface and beverage conduit are mutually exposed to a heat transfer medium, such as water.

Another object of the present improvements is to provide a novel chilling chamber or receptacle including a novel arrangement of the beverage conduit and refrigerating surface.

The provision of an automatic refrigerating unit adapted to be incorporated in existing bottle coolers of the type described, to supplant the unsanitary and inconvenient cracked ice normally employed therein, constitutes a further object of the improvements.

A still further object is to provide a novel beverage cooler peculiarly adapted for interstate shipment wherein means are provided for automatically draining the refrigerating system into a reservoir which latter is removable and replaceable at will.

The novel provision of a restricted inlet in the expansion chamber in combination with a regulator in advance thereof whereby the efficiency of the circulating medium employed in the refrigerating cycle is increased, constitutes a further object of the improvements.

Further objects include the provision of a replaceable reservoir for the circulating medium, a novel expansion chamber peculiarly adapted for use in beverage coolers, and others.

In general, the present improvements are designed to improve and increase the efficiency of this type of cooler as a whole and to provide a device that is light, portable, sturdy and durable as well as automatic in its operation.

Other objects and advantages of the present improvements will be apparent to those skilled in the art upon reference to the accompanying specification and drawing, in which:

Fig. 1 is a side view of a beverage cooler embodying the present improvements, some parts in section, others in elevation and others broken away for convenience in illustration;

Fig. 2 is an enlarged view of the float controlled regulator;

Fig. 3 is an enlarged side view of the replaceable reservoir.

Referring to the drawing, the glass bottle or receptacle 5 is of the usual type, being normally filled with drinking water or other beverage. As illustrated, the receptacle 5 is inverted and suitably supported on the cooler cabinet or housing 6, with a portion thereof protruding into said housing. The upper portion of the housing 6 defines a cooling chamber or receptacle 7 and is designed to retain a liquid, such as water for the purpose hereinafter set forth.

Adjacent the periphery of said receptacle 7 and within same, a beverage conduit 8 is disposed. This conduit is provided with a screw threaded inlet 9, disposed adjacent the top of chamber 7 and in position for receiving the screw threaded mouth of an inverted vessel, as for example, bottle 5. A section 8$^a$, of the conduit 8, protrudes through the wall of the housing and terminates in faucet 10, whereby water from the bottle 5 may be tapped directly without being cooled or chilled. As illustrated, the conduit 8 terminates in a faucet 11, adjacent the aforementioned faucet 10. That section of the conduit which is intermediate faucet 11 and conduit section 8$^a$ is exposed throughout the major extent thereof to the cooling operation, so that cooled water may be tapped therefrom. A valve controlled drain 40 for emptying chamber 7 is also provided.

While the conduit 8, for conveying the beverage from bottle 5, through the cooling region to faucet 11, may be variously arranged, it is preferably disposed in helical coils adjacent the periphery, as illustrated, for exposing a greater surface to the cooling region and therefore subjecting the beverage to chilling for a greater period.

The base of receptacle 7 is apertured substantially at its center for accommodating the refrigerating surface of the automatic refrigerating unit. This surface is defined by the expansion chamber of the unit in the form of a dome 12 of the type set forth in my aforementioned copending application. This dome is preferably of circular cross section and is provided at its base with an annular flange whereby, in conjunction with suitable packing, insulation, etc., said dome is secured in liquid tight relation with the base of receptacle 7. In the normal operation of the device, a heat transfer medium, such as water, is placed in chamber 7 substantially to the level indicated, whereby the dome 12 and coiled conduit 8 are submerged therein, both the dome and a substantial portion of conduit 8 being thereby mutually exposed to the same water bath.

As illustrated, the refrigerating unit is housed in the lower portion of cabinet 6 and comprises a compressor 13 having its pressure or discharge side communicating with condenser 14 by conduit 15, the latter in turn communicating with reservoir 16 by pipe 17. An outlet from said reservoir is provided by conduit 18, leading from adjacent the bottom thereof to the float regulator 19, whence a conduit 20 leads to expansion chamber 12, in which it terminates in the restricted orifice 21. Communication between the interior of dome 12 and the suction side of compressor 13 is provided by conduit 22 having check valve 23 therein.

The motor 24, for driving compressor 13, is supplied with electrical energy by wire 25 leading from a wall socket or other convenient terminal (not shown) to motor 24 and thence to thermostat 26 disposed in dome 12. As described in my copending application, the thermostat 26 makes or breaks the circuit to motor 24 in response to thermal conditions in and surrounding dome 12, whereby the operation of the unit is entirely automatic.

The refrigerating medium employed for circulation, in the system described, preferably comprises a lubricating oil and methyl chloride, the functions and advantages of which are more fully set forth in said copending application. The cycle includes the compression of the chloride with the oil, in compressor 13, condensation thereof in condenser 14, discharge into dome 12 where vaporization takes place, and withdrawal of the oil and volatile chemical into the compressor.

The float regulator 19, set in the conduit between compressor 13 and the restricted orifice 21 in expansion chamber 12, comprises the chamber 27, float 28, inlet 29, screened outlet 30 and needle valve 31 (see Fig. 2). Valve 31 controls the flow of the oil and chemical into conduit 20. During operation, the liquid being supplied from the compressor through reservoir 16, enters chamber 27 from pipe 18, and as the level rises, the float 28 rises causing valve 31 to open, whence the liquid level may recede and valve 31 again close.

Upon reference to my copending application it will be seen that the orifice 21 serves as a "liquid valve" or regulator whereby the vaporization of the chemical, as it enters and is diffused in the body of oil within dome 12, is regulated. However the regulator 19 controls the supply to orifice 21 and it is notable that the novel combination of these two regulators constitutes a refinement of construction for promoting greater efficiency in the device.

It has been found, that the use of regulator 19 and conduit 20, the latter being unrestricted and freely communicating with chamber, causes premature vaporization of the chemical with the attendant disadvantage of frosting of conduit 20 as well as loss of cooling effect in dome 12. Accordingly, the provision of restricted orifice 21 in conjunction with regulator 19 prevents frosting on pipe 20, since vaporization of the chemical is prevented in advance of said orifice. By choking the medium in pipe 20, as hereinafter described, the medium itself serves to keep the walls of said pipe above frosting temperature. Furthermore, orifice 21 prevents any cooling effect taking place in dome 12, from creeping back and being experienced in pipe 20.

It is notable that the conduit 15, condenser 14, pipe 17, reservoir 16, conduit 18 and regulator 19 contain the oil and liquid chemical under pressure and therefore a constant supply is being urged, into chamber 27 of regulator 19, at all periods of operation. Assuming orifice 21 is omitted, under such conditions, float 28 would be up, needle valve 31 open, so that the suction in the low pressure side of the system, viz. conduit 20, chamber 12 and pipe 22, would be freely drawing the circulating medium around the system without obtaining efficient cooling results in chamber 12. Accordingly, the restricted orifice 21 also serves as a choke for the system, as well as a regulator for reservoir 16, member 19 and dome 12.

As stated in my copending application, the low pressure in pipe 22 and chamber 12, causes the body of oil in said chamber to be in a state of "boiling" or ebullition, so that the full effect of the change of state of the chemical (accompanied by the taking up of heat) is experienced by the walls of the chamber. The orifice 21 therefore insures this "boiling" in the chamber by preventing the oil and chemical from being drawn in too rapidly by the suction. At the same time it so chokes the supply of this medium and prevents its too rapid egress from regulator 19, that an excess of the medium is always maintained in reservoir 16. This is due to the fact that the compressor is constantly supplying the medium under pressure to reservoir 16 and regulator 19 at a faster rate than restricted orifice will permit its discharge into dome 12. The orifice 21 is therefore responsible for certain essentials of the system such as insuring an excess of the medium in reservoir 16 so that regulator 19 will always have a generous supply, and insuring the proper quantity of the medium in chamber 12 as well as maintaining the "boiling" therein.

Referring to Fig. 3, the conduits 17 and 18 are provided with valve controlled couplings 32 and 33 in advance of their entry into reservoir 16. During normal operation, these valves are, of course, open so that continuous communication from compressor 13 to expansion chamber 12 is afforded. When it is desired to drain the oil and chemical from the system, valve 33 is closed and the motor driven compressor functions to pump the liquid from the system into reservoir 16. Suitable gauges may be provided for indicating when the major portion of the liquid has been drained so that valve 32 may then be closed and the reservoir 16 removed.

This replaceable feature is of importance due to the fact that a fresh charge of liquid in a reservoir may be brought up and attached without inconvenience, should the liquid in use become fouled, deteriorate or for other reasons need to be replenished. Inspection of the system as a whole is also greatly facilitated by the draining provision.

The rates on shipments in inter-state commerce are known to be higher on merchandise including chemicals and in devices of the character in question, the chemical constitutes but a fractional part of the total weight. Accordingly, a distinct saving results where the article may be shipped separately from the chemical. In the present instance, the removable reservoir permits the cooling cabinet, etc. to be forwarded for a materially lower rate, while the reservoirs and chemicals therein may go forward separately under the rate determined for such materials.

Referring now to the cooling of the beverage in chamber 7, when the bottle 5 is placed in the illustrated position, the liquid therein is conducted through and obtains in conduit 8. The latter is submerged in water in chamber 7 as is also the expansion chamber or dome 12. Assuming that the temperature of the water is above the operative temperature, the thermostat 26 closes the circuit to the motor 24 and the refrigerating system is automatically started. The expansion of the liquid chemical to a vapor in chamber 12, is attended by the abstraction of heat from the chamber walls (12), water bath in chamber 7 and coiled conduit 8 as well as the beverage in the latter. The chilled beverage may thus be tapped from faucet 11.

When the temperature in chamber 12 and other elements in chamber 7 have reached the predetermined low degree for which the thermostat is set, the current is automatically shut off and the system remains dormant until the temperature rises sufficiently to incept the operation of the system, which again occurs automatically.

The advantages of the present improvements will be apparent. The chilling is accomplished in an entirely automatic manner, requiring no human attention, such as ice replenishing. Furthermore, the beverage has no opportunity to become contaminated, since it is not emptied into a receptacle to be chilled where a portion of it may become stagnant, but is conducted directly from the bottle to the faucet without the intermediacy of a storage or cooling vessel.

Other advantages and modifications of the present improvements will be apparent to those skilled in the art, and it is understood that the invention is not limited to the details of construction herein set forth.

I claim:

1. In a beverage cooler adapted to removably support inverted vessels containing liquid to be chilled, the combination of a liquid receptacle partially filled with liquid, a conduit coiled adjacent the inner periphery thereof and terminating with an inlet adapted to receive the mouth of an inverted vessel, said conduit having a plurality of faucets communicating therewith at spaced points, a portion of said conduit between said faucets being immersed in said liquid, and a refrigerating dome disposed in the base of said receptacle and adapted to chill the beverage in said coiled conduit through said liquid in the receptacle.

2. In a beverage cooler, the combination of a liquid receptacle partially filled with liquid, a conduit disposed in said receptacle having a beverage inlet disposed above the liquid level in the receptacle, said conduit having a portion with a faucet above the liquid level for discharging unchilled beverage, said conduit having a section immersed in said liquid, said section having a faucet for discharging chilled beverage, and a cooling instrumentality disposed in said receptacle and adapted to chill the beverage in said conduit section through the liquid in said receptacle.

3. In a beverage cooler, the combination of a receptacle defining a cooling chamber, a cooling medium disposed in the lower portion of said chamber, a beverage passage extending through the upper portion of said chamber out of contact with said medium, a beverage passage extending through the lower portion of said chamber exposed to said medium, and faucets for said passages exterior to said chamber whereby chilled or unchilled beverage may be discharged therefrom.

4. In a beverage cooler, the combination of a receptacle defining a cooling chamber, a cooling medium disposed in the lower portion of said chamber, conduit means disposed in the upper portion of said chamber and having a faucet for discharging unchilled beverage exterior of said chamber, conduit means exposed to said medium in the lower portion of said chamber and having a faucet for discharging chilled beverage exterior of said chamber, and a common beverage supply means for both said conduit means.

Witness my hand this 30th day of January, 1929, county of New York, State of New York.

ALBERT C. DENSLOW.